(No Model.) 2 Sheets—Sheet 1.

A. J. LANSING.
STALL FLOOR.

No. 360,452. Patented Apr. 5, 1887.

Witnesses.
Tom R. Stuart
L. Seward Bacon.

Inventor:
Andrew J. Lansing,
By E. N. Marble
Atty.

(No Model.) 2 Sheets—Sheet 2.

A. J. LANSING.
STALL FLOOR.

No. 360,452. Patented Apr. 5, 1887.

Witnesses.
Jno. R. Stuart,
L. Seward Bacon.

Inventor
Andrew J. Lansing.
By Emmons Noble
Atty.

UNITED STATES PATENT OFFICE.

ANDREW J. LANSING, OF IONIA, MICHIGAN.

STALL-FLOOR.

SPECIFICATION forming part of Letters Patent No. 360,452, dated April 5, 1887.

Application filed October 11, 1886. Serial No. 215,873. (No model.)

*To all whom it may concern:*

Be it known that I, ANDREW J. LANSING, a citizen of the United States, residing at Ionia, in the county of Ionia and State of Michigan, have invented certain new and useful Improvements in Stall-Floors; and I do hereby declare the following to be a full, clear, and exact description of the invention, such as will enable others skilled in the art to which it appertains to make and use the same.

My invention relates to stall-floors; and it consists in the construction and arrangement of the parts of the same, which will be more fully hereinafter described, and pointed out in the claims.

One object of my invention is to provide a stall-flooring which will be at all times dry, and thereby keep the animal in a cleanly condition.

A further object of my invention is to provide a stall-floor constructed of several separate strips, thereby providing means for the animal to brace himself against injury while standing or in the act of lying down, slipping being prevented in both instances.

A further object of my invention is to provide a stall-flooring with an earth-pit in the forward portion thereof, whereby a tender-footed animal may be kept from hurting or aggravating his feet by having a soft rest under the same.

A further object of my invention is to provide a stall-flooring having suitable pans or receptacles under the same, whereby the urine or other fluid cast out by the animal may pass through the slatted floor into said pan and be carried off.

A further object of my invention is to provide a stall-flooring so hinged that a portion thereof may be raised endwise and a portion sidewise, so that the parts may be readily cleaned, and by raising the side hinged section protection may be afforded against a vicious animal.

A further object of my invention is to provide a stall-flooring which is simple and effective in its construction, easily handled and operated, readily understood, and one which combines utility and convenience.

I attain these objects by the construction illustrated in the accompanying drawings, wherein like letters of reference indicate similar parts in the several views, and in which—

Figure 1:
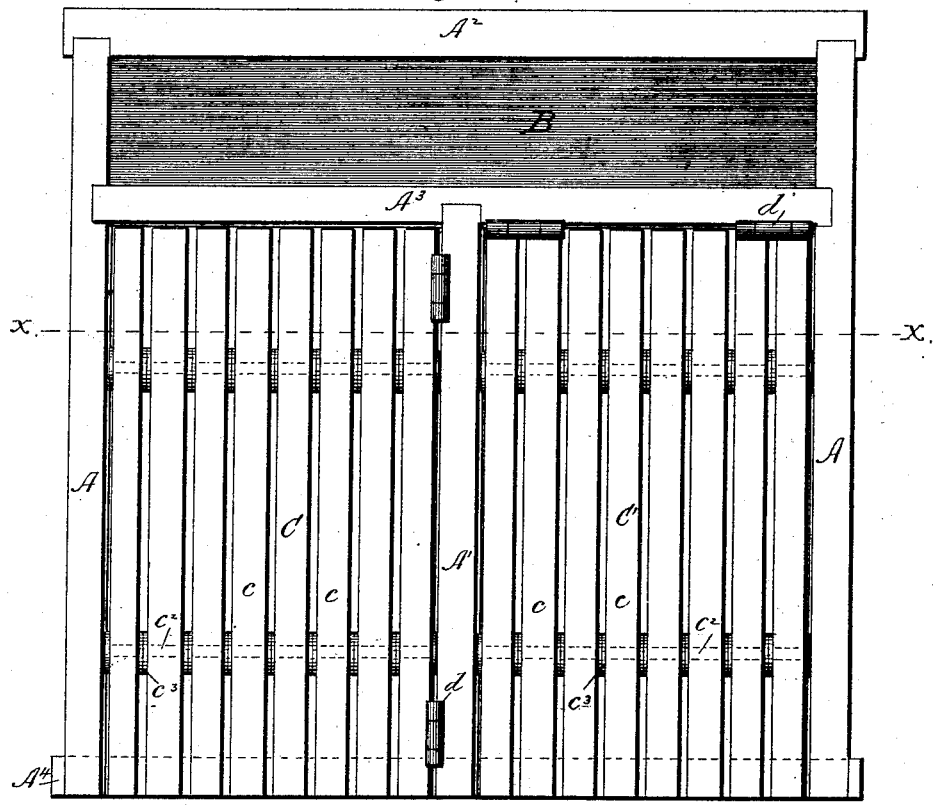
Figure 2:
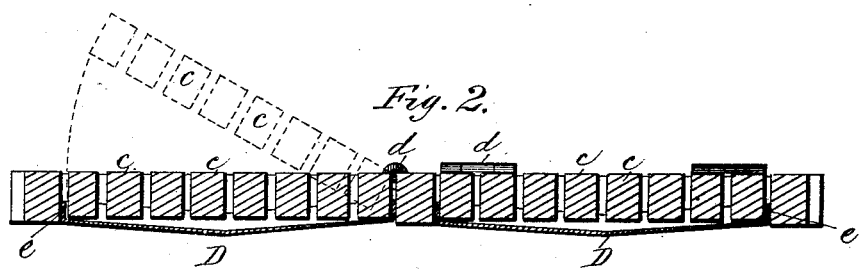
Figure 3:
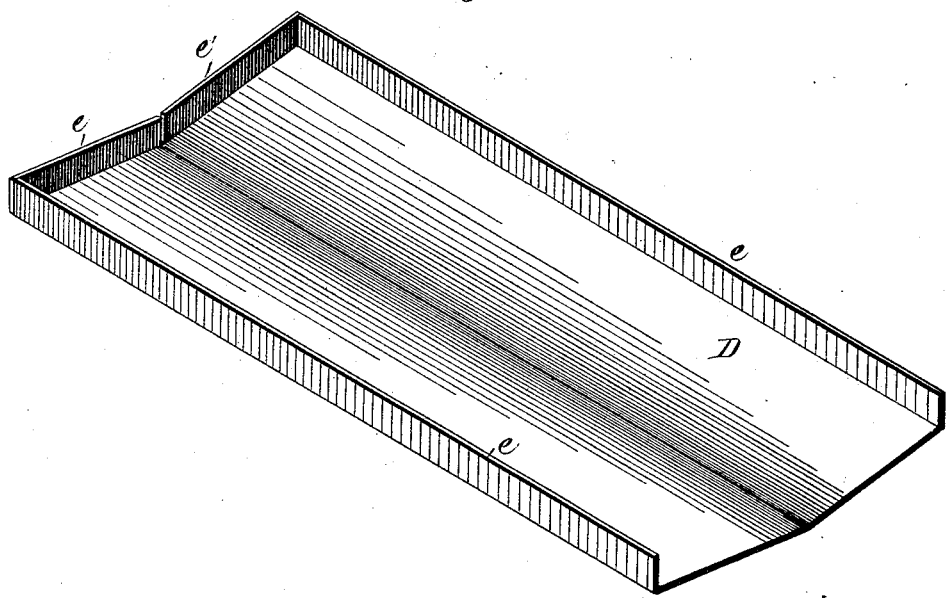

Figure 1 is a top plan view of my improved stall. Fig. 2 is a cross-section of the same on the line X X of Fig. 1, showing one part tilted on its hinges. Fig. 3 is a detail perspective view of the pan or receptacle.

A A represent the two side beams; A', the central bar or beam; $A^2$ and $A^3$, the two forward cross-beams, and $A^4$ the rear cross-beam. Between the two forward cross-beams, $A^2$ and $A^3$, and the side beams, A A, a dirt pit, B, is formed, which is adapted to be filled with earth, for a purpose which will be more fully hereinafter described.

Situated between the side beams, A A, and separated by the central beam, A', is a slatted floor, constructed in two parts, C C', hinged at the sides and ends, as shown. Each part of this floor is made with a series of wooden strips or slats, c, running lengthwise of the stall and having their forward ends abutting against the cross-beam $A^3$, and their lower or outer ends resting on the rear cross-beam, $A^4$. These strips c are placed a short distance apart from each other, thereby leaving open spaces between them, and are all securely held in place by metal rods $c^2 c^2$, running transversely therethrough. The strips are rigidly held in place and prevented from being forced together by suitable packing or washers, $c^3$, placed between the same, and through which the rods $c^2$ pass, thereby forming a rigid and substantial floor. The floor thus formed is detachable on all its sides, which allows of an easy removal of the parts; but to prevent any displacement, and to retain them in their desired position and still allow of an adjustment sufficient to remove the pans below, they are secured to the center beam and cross-bars, respectively, by suitable hinges, d d, that portion marked C being secured to the center bar and raised sidewise, and that marked C' to the cross-bar $A^3$ and opening endwise.

Situated directly below the floors C and C' are metal pans D, having their lower or outer ends resting on the cross-beam $A^4$, and their remaining portion on the floor of the stable, or suitable beams, which are properly raised to give them the desired slant. These pans are closely fitted in the spaces under the floor, and have bent-up edges $ee$ and upper ends, $e'$, thus preventing any of the animal fluid or dirt from getting below the floor.

The bottom portions of the pans D are made to incline downward from both sides toward the center, thereby forming a gutter in which the fluids are conducted off and out at its lower end to a suitable drain. These pans may be made removable, if desired, so that if at any time it is desired to remove them for cleaning or repairing, it is only necessary to raise the slatted floors and lift them out of their respective places.

By placing the strips $c$ so as to leave a space between them I accomplish a twofold result, viz: first, preventing the animal from injuring itself by slipping when it is in the act of lying down or rising up, this being accomplished by the calks on the shoe or the sides of the hoof coming in contact with the edges of the strips; and, second, carrying off all of the animal fluids that are ejected on the floor into the pan below, thus keeping the floor dry.

By means of the earth-pit B an easy rest for the forward feet of the animal is provided.

I do not limit myself to a slatted stall-flooring having two hinged parts, nor to said parts being hinged on the sides and ends, as it is evident that a slatted stall-flooring might be constructed of one part hinged at its side or end and adapted to be raised entire either way.

Neither do I limit myself to separate pans under each part, as it is evident a single pan might be made to cover the entire surface under the slatted flooring.

Having thus described my invention, what I claim as new, and desire to secure by Letters Patent, is—

1. In a stall-flooring, the combination of a slatted flooring constructed in two sections, one of which is hinged at the end and the other at the side, and thereby adapted to be raised sidewise and endwise, an earth-pit at the forward part thereof, and removable pans under the hinged slatted portions, substantially as described.

2. In a stall-flooring, the combination, with the two hinged sections C and C', adapted to be raised in two different directions, the slats $c$ whereof are mounted upon metallic rods $c^2$ with washers $c^3$ between said slats, of an earth-pit, B, extending across the entire width of the front part of the flooring, and metallic guttered pans D, removably situated beneath each of said hinged floors, substantially as described.

In testimony whereof I affix my signature in presence of two witnesses.

ANDREW J. LANSING.

Witnesses:
ETHAN T. MONTGOMERY,
ALEX. W. DODGE.